No. 817,124. PATENTED APR. 3, 1906.
F. LOEFFLER.
BALL BEARING.
APPLICATION FILED AUG. 19, 1903.

Witnesses:
Fred S. Greenbaum.
Warren D. Oliver.

Inventor.
Fritz Loeffler,
by Crosby & Gregory
Attys.

UNITED STATES PATENT OFFICE.

FRITZ LOEFFLER, OF NEW YORK, N. Y.

BALL-BEARING.

No. 817,124.      Specification of Letters Patent.      Patented April 3, 1906.

Application filed August 19, 1903. Serial No. 169,965.

*To all whom it may concern:*

Be it known that I, FRITZ LOEFFLER, a subject of the German Emperor, residing at New York, in the county of New York and State of New York, have invented an Improvement in Ball-Bearings, of which the following description, in connection with the accompanying drawings, is a specification, like letters on the drawings representing like parts.

This invention relates to a ball-bearing more especially devised to overcome friction due to end thrust.

In accordance with this invention I employ a cage having peripheral recesses in each of which is placed a ball, and these recesses are closed by ball-tracks containing a series of balls that contact with the larger ball, that I may hereinafter designate as the "main" ball. The main ball is of such diameter with relation to the cage and its recesses that portions of the main ball will be exposed at each side of the cage to contact simultaneously with two tracks, one of which in practice will be free to revolve, while the other may be stationary. This class of bearing is desirable for use in connection with numerous mechanical constructions, and as exemplifying one use to which the bearing may be put I have chosen to illustrate the same. The main balls are shown as arranged to travel over tracks forming part of a bearing of the end-thrust variety.

Figure 1:
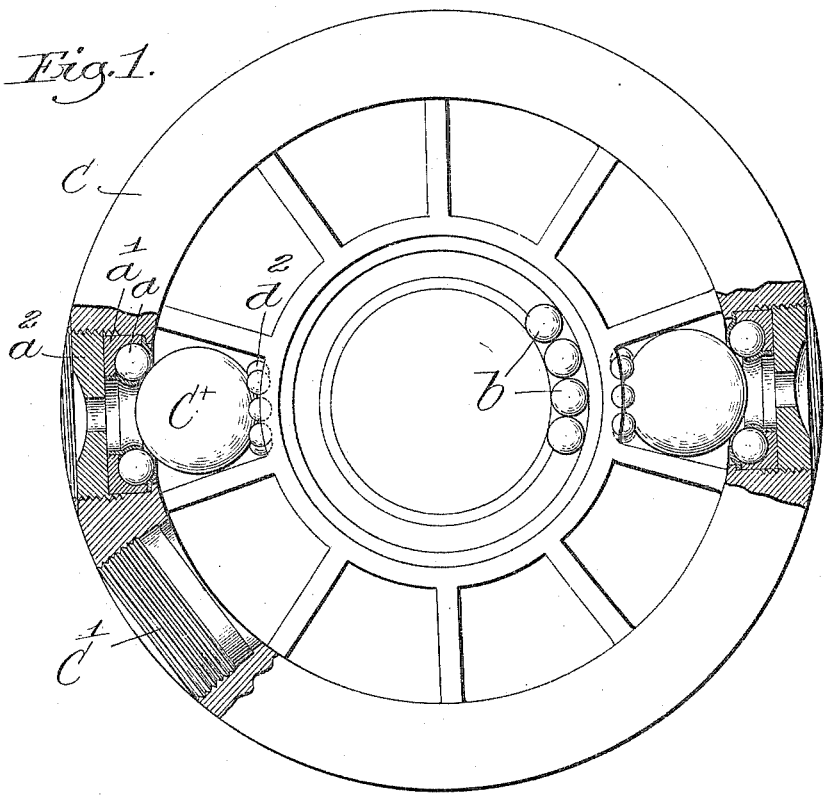
Figure 2:
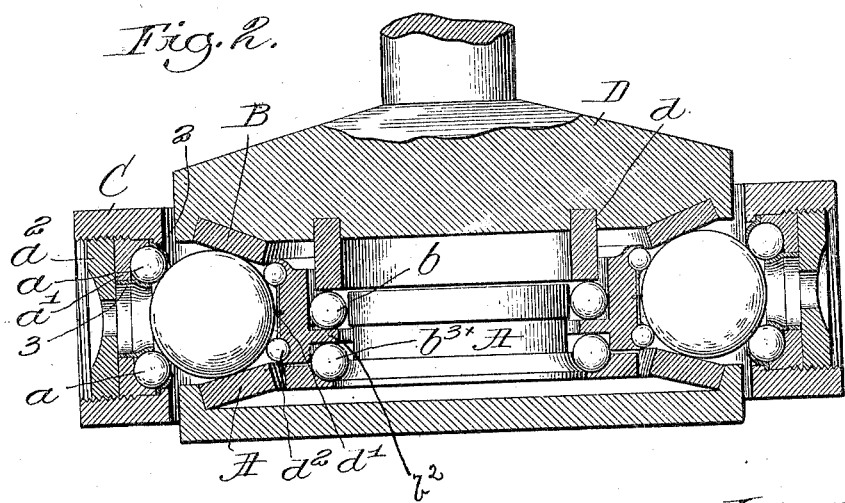

Figure 1 in section represents a cage containing end-thrust means embodying my invention. Fig. 2 is a side elevation of the cage.

In one practical form in which I have chosen to illustrate my novel bearing, A and B represent tracks forming parts of a bearing of usual construction where end thrust is to be provided for. The faces of these tracks are so tapered with relation to each other that if prolonged toward the axle forming part of the bearing said faces would intersect a line drawn through the longitudinal axis of the shaft. The cage C, containing the main balls $C^\times$, has a series of peripheral recesses $C'$, through which the balls are entered in taking their working positions, the diameter of the balls being in excess of the thickness of the cage, so that their peripheries project at each side said cage and contact with said tracks across which they roll in a circular path concentric to the longitudinal axis of the conical roller. In this construction the tracks exert a pressure on the main balls that tends to force them outwardly away from the longitudinal axis of the conical roller; but this tendency to move in that direction, as well as the outward movement of the balls due to centrifugal action, is resisted by a series of small balls $a$, that constitute antifriction means, said small balls being contained in separate ball-tracks $a'$, inserted in the mouths of the recesses $C'$. The ball-tracks will be held in working position in the cage by a screw-plug $a^2$. The ball-tracks will in practice have connected with them some suitable ball-retainer, whereby the tracks may be removed from the cage without the balls escaping therefrom, I having shown in Fig. 2 at 2 and 3 one form of such retainer. The inner circle of the cage next the journal of the conical roller is notched to receive a series of balls $b$, and the disk D has a portion $d$ at its face presenting a plane surface to contact with said balls, while at the end of the conical roller there is a circular rib $b^2$, that is grooved to receive a second set of balls $b^{3\times}$. In this way by the two sets of balls $b$ and $b^{3\times}$ the cage C will be antifrictionally sustained against movement at right angles to the longitudinal axis of the conical roller with which it coacts.

I may use, if considered necessary, ball-tracks $d''$ in the bottom of each recess entered by the main balls, said tracks containing a series of auxiliary balls $d^2$, as at the left, Figs. 1 and 2.

Having described my invention, what I claim, and desire to secure by Letters Patent, is—

1. In a thrust-bearing, a rotatable cage, a series of main balls therein, a series of ball-tracks in said cage, and a series of smaller balls in said ball-tracks contacting with said main balls.

2. In a thrust-bearing, a rotatable cage, a series of main balls therein, a series of ball-tracks in said cage, and a series of small balls in said ball-tracks contacting with said main balls, and means for adjusting said tracks.

3. In a thrust-bearing, a rotatable cage, a series of main balls therein having their peripheries exposed at the sides of said cage, plane-faced tracks meeting said main balls at a tangent and over which said balls roll in the rotation of said cage, a series of ball-tracks located at the periphery of said cage and provided with balls contacting with said main balls and serving to resist the outward movement of said main balls with relation to said cage.

4. In a thrust-bearing, a rotatable cage, a series of main balls, a series of ball-tracks of different diameters and a series of balls in each of said ball-tracks, said balls contacting with said main balls, the balls in the track of least diameter being smaller than those in the larger track.

5. A thrust-bearing comprising a cage, a series of main balls, a series of ball-tracks, and a series of smaller balls in said ball-tracks and contacting with main balls, a series of balls located at the inner edge of said cage, and additional balls to sustain the weight of the cage and prevent the weight of said cage from being carried wholly by the balls in said ball-tracks.

6. A thrust-bearing comprising a cage, a series of main balls, a series of ball-tracks, and a series of smaller balls in said ball-tracks and contacting with main balls, two sets of ball-tracks and balls therein, said balls sustaining the main balls at opposite sides of a diameter through said main balls.

In testimony whereof I have signed my name to this specification in the presence of two subscribing witnesses.

FRITZ LOEFFLER.

Witnesses:
JULIUS A. PERKINS,
EDWARD E. BRUCE.